Patented Oct. 21, 1947

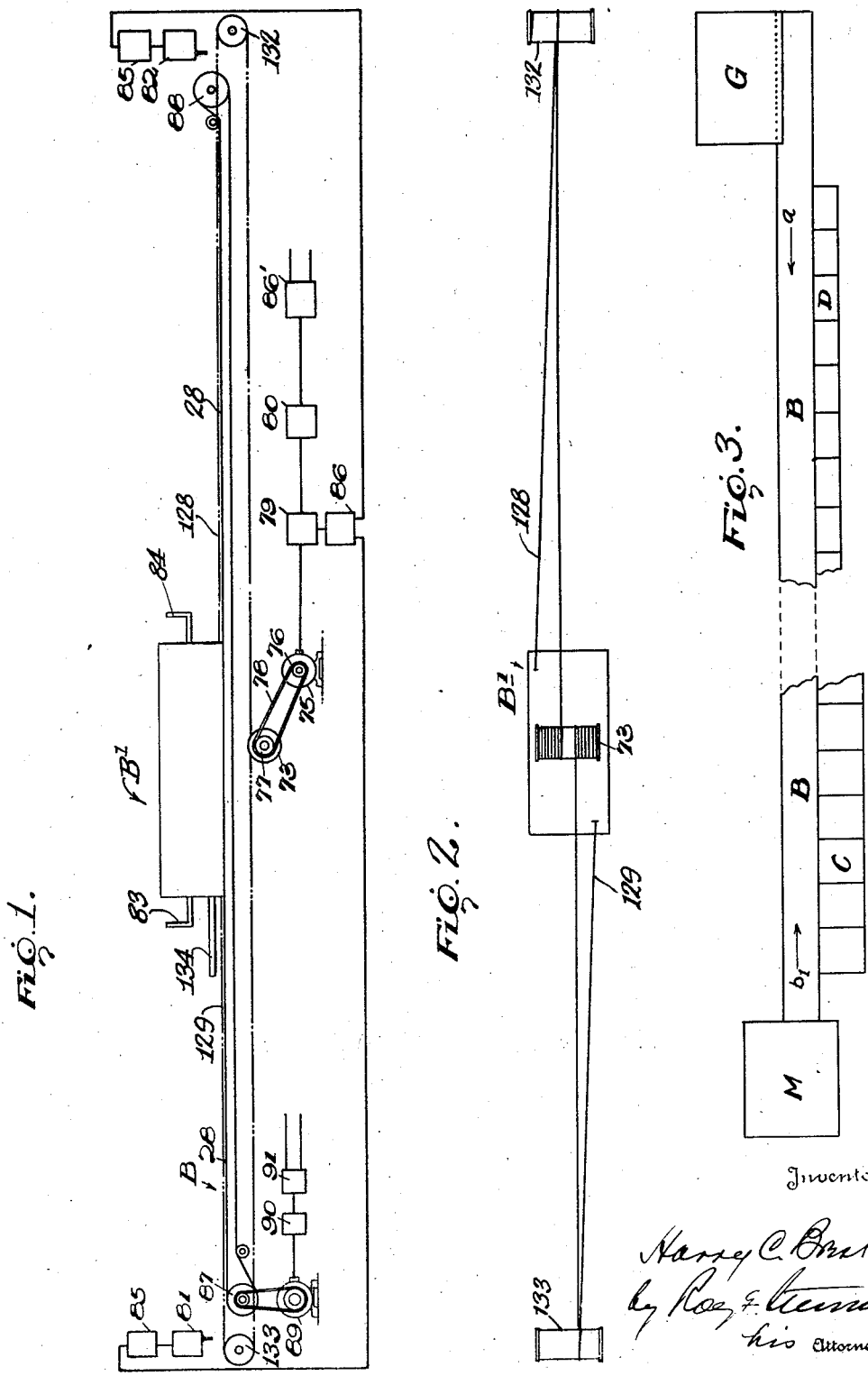

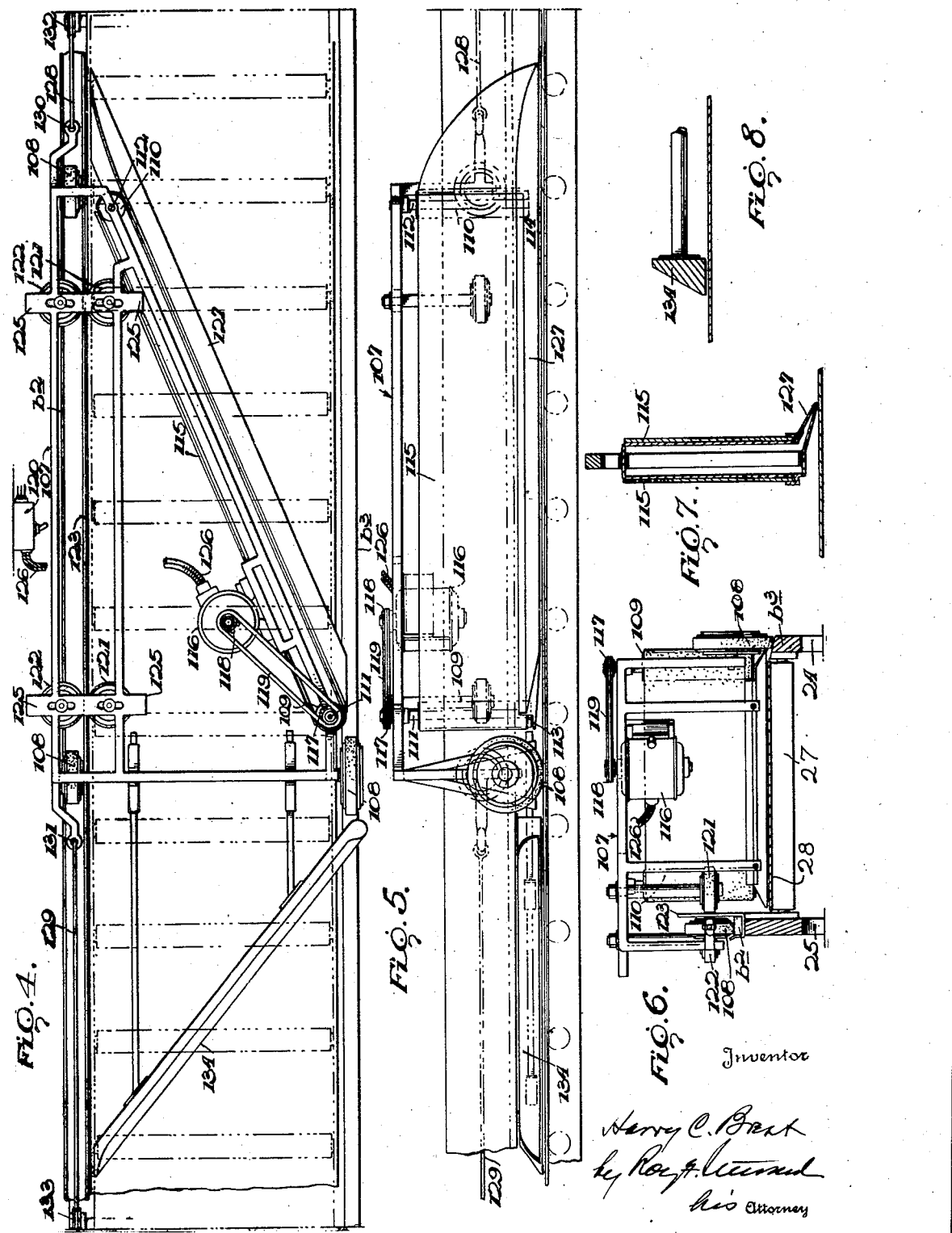

2,429,386

UNITED STATES PATENT OFFICE 2,429,386

APPARATUS FOR HANDLING PLANT PRODUCTS

Harry Clinton Brest, Pomona, Calif., assignor to Brogdex Company, Pomona, Calif., a corporation of California Original application December 27, 1941, Serial No. 424,672, now Patent No. 2,336,775, dated December 14, 1943. Divided and this application November 17, 1942, Serial No. 465,851

1 Claim. (Cl. 198—185)

This invention relates to an apparatus for handling plant products, and is a division of applicant's application Serial No. 424,672, filed December 27, 1941, now Patent No. 2,336,775, granted December 14, 1943.

It has been common in packing houses to provide apparatus for use in preparing, grading and packing for market a certain type or kind of plant product, for example, lettuce. This apparatus was operated during the season for harvesting and marketing such plant product, but when the season was over said apparatus was idle until the next season. In some packing houses, it has been common to dismantle the said apparatus and install another apparatus for operating on a different kind of plant product which matures and comes onto the market at a date later than said first mentioned plant product. As an illustration of the two kinds of plant products which are handled seriatim in some packing houses, lettuce and cantaloupes may be mentioned.

The treatment of lettuce in preparing it for market is so different from the treatment of cantaloupes in preparing them for market that a large part of the apparatus heretofore used in preparing lettuce is not suitable for use in preparing cantaloupes, and vice versa.

It is obvious that to dismantle and move an extensive lettuce handling apparatus, or a large part thereof, and replace it with an extensive cantaloupe handling apparatus, in a packing house, and thereafter to dismantle and remove the cantaloupe apparatus and restore the lettuce apparatus ready for the next season, involves considerable expense for labor, often amounting to as much as $2000, which of course, must be included in the cost of doing business. In addition, however, there must be a charge to cover the cost of storage and interest on the investment for each type of apparatus, and as each is idle for a considerable part of the year, because of the seasonal nature of its use, the cost of marketing the two types of plant products is enhanced to a considerable extent.

An important object of the present invention is to avoid the disadvantages hereinbefore pointed out and thereby materially reduce the cost of marketing each plant product handled in a packing house provided with applicant's apparatus.

With this general object in view and some others which will be obvious to those skilled in the art from the description hereinafter, the invention consists in an apparatus which, by a slight alteration of parts, may be used for preparing, grading and packing either of at least two kinds of plant products, more particularly lettuce and cantaloupes, thereby providing a compact practically permanent installation, ready to handle either plant product by a slight and relatively quickly made alteration, the construction being such that a large part of the apparatus functions for handling both kinds of plant product, thereby cutting down appreciably the cost of the original investment, not only reducing the charge for interest on the investment, but, because of the longer use of such conjointly functioning apparatus, reducing the pro rata cost of handling each product. Furthermore, the expense for dismantling, removing, storing and replacing an apparatus as hereinbefore referred to, is entirely avoided.

An apparatus embodying the invention will be described in connection with the accompanying drawings which illustrate an apparatus suitable for use in preparing, grading and packing for market lettuce and similar products, such as cabbage and cauliflower, and also melons or similar products, including cantaloupes.

In the drawings,

Figs. 1 and 2 are diagrammatic illustrations, in side elevation and plan, respectively, of suitable means for traveling the unloading device longitudinally of the main conveyor in both directions;

Fig. 3 is a diagrammatic plan, illustrating the general arrangement whereby the apparatus of the invention is adaptable to supply different plant products to opposite ends of the main conveyor;

Figs. 4 and 5 are a plan and a longitudinal side elevation, respectively, of another form of unloading or distributing device which may be employed; and Figs. 6, 7 and 8 illustrate details of the unloader or distributor shown in Figs. 4 and 5.

In order to accomplish the purposes of the invention, a plant embodying the present invention is constructed to provide a series of bins of a permanent or fixed type and a series of convertible bins arranged to cover and be supported by the permanent bins, the permanent bins being capable of holding one type of plant product, such as lettuce, and the convertible bins being capable of serving in part as chutes and also as bins to supply conveniently to the packer another type of plant product, such as cantaloupes; all as disclosed in Patent No. 2,336,775 aforesaid. Alongside the series of bins runs an endless belt conveyor whose upper run is at such a level above both series of bins that the plant products may be discharged into the appropriate series of bins without injury.

At one end of the endless conveyor there is provided suitable means for supplying one type of plant product to the endless conveyor, and at the opposite end of the endless conveyor there is provided suitable means for supplying the second type of plant product to the same endless conveyor. The endless conveyor is driven by means adjustable to determine the direction of travel of the upper run thereof, and there is also provided a traveling unloading device which can be moved along the endless conveyor back and forth independently of the direction of movement of the upper run of the belt, and thereby can be arranged to deliver either of the two types of plant product then being handled to any one of the series of bins at that time in use.

The diagram, Fig. 3, is intended to illustrate two conditions of operation of the endless belt conveyor, in relation to the appropriate series of bins and the respective means for supplying plant products at each end of the endless conveyor.

For example, in this Fig. 3, G represents means (e. g. an elevator) for supplying lettuce to the right hand end of the upper run of the endless belt conveyor indicated generally at B, at that time running in the direction of the arrow $a$. Said conveyor receives heads of lettuce from the means G and transports them in the direction of the arrow, so that they are delivered seriatim by suitable unloading apparatus, not shown in Fig. 3, to the appropriate lettuce receiving bins, a part of which series is indicated at D in Fig. 3. It is to be understood that the endless belt conveyor extends the entire length of the series of bins D, which may be in any desired number.

If, however, the apparatus is to handle the second type of plant products, which may be assumed to be cantaloupes, the endless belt conveyor is driven in the opposite direction so that its upper run will travel in the direction of the arrow $b_1$, shown at the left in Fig. 3; and means M (e. g. an elevator) for supplying cantaloupes is put in action to supply cantaloupes to the left hand end of the upper run of the endless belt conveyor, B. Under this condition of operation the convertible bins indicated at C and constituting a series extending the required length are arranged above the lettuce bins D but with their higher ends below the level of the upper run of the endless belt conveyor. Owing to the direction of movement of the upper run of the belt shown by the arrow $b_1$ the cantaloupes delivered by the cantaloupe supplying means M will be transported in the direction of said arrow, and will be delivered seriatim to the bins C by the shiftable unloading device hereinafter described.

While, in general operation, the unloading device will automatically travel back and forth along the belt conveyor, the means for traveling the unloader has the further advantage that it may be adjusted to leave the unloader stationary at any one of the series of bins in case it is necessary to fill only one bin at a time, instead of merely distributing a small supply of plant products to each of the bins of a series then in use.

The endless belt conveyor B comprises a suitable frame having supports, the upper parts of which are shown at 24 and 25, Fig. 6. The conveyor is constructed in the usual manner and includes a series of upper rollers 27 (Fig. 6) which support the upper run of an endless conveyor belt 28, usually of rubber, canvas, or other flexible material which will not injure the plant products. The main conveyor B has its frame provided at the top with tracks $b^2$ and $b^3$, on which an unloading apparatus may travel back and forth longitudinally of the said main conveyor.

In an unloading device suitable for use with the present main conveyor, positive means are provided for moving the plant product transversely from the main conveyor belt 28, instead of depending upon mere inclined sheer boards to direct them to the margin of the main conveyor belt. This is an important feature of the invention.

The unloading apparatus shown in Figs. 4 to 8 comprises a frame 107 of suitable construction provided with rubber tired wheels 108 arranged to run on tracks $b^2$, $b^3$, carried by the main conveyor frame. The frame 107, in the example illustrated, has that end which it to face the oncoming plant products, arranged in an erect or generally vertical plane which extends transversely and is inclined at an angle to the length of the main conveyor.

A pair of vertical rotatable rollers 109 and 110, are mounted in upper journals 111 and 112, and lower journals 113, and 114, carried by the inclined end of the frame. Around these rollers passes an endless belt 115 which may be termed a deflection belt. The shaft of at least one of the belt rollers, for example, roller 109, is arranged to be rotated in any suitable way, most advantageously by an electric motor 116 carried by the frame, which motor drives the said belt roller 109 through a suitable driving connection such as a pair of sprocket wheel 117 and 118, one fixed to the upper end of the shaft of roller 109 and the other driven by the motor shaft, these sprocket wheels being connected by a sprocket chain 119. Suitable means are provided for stopping, starting and controlling the electric motor, indicated generally as a switch box 120 located at any desired place.

In addition to the wheels 108, which support the frame on tracks carried by the main conveyor frame, the unloader frame also carries suitable means for preventing its lateral displacement relative to the main conveyor frame. In the present embodiment of the invention, this said means comprises four alignment or guide rollers 121 and 122, arranged in pairs on substantially vertical axes carried by the frame, and arranged to run on opposite lateral sides of a vertical web of a guide rail 123 carried by the main conveyor frame, which may be a part of the track $b^2$.

In the best embodiment of the invention the axes of the guide rollers 121 and 122 are journaled in bars 125 which are secured to the unloader frame so as to permit their adjustment toward and from the guide rail, as for example by slots in the bars through which the securing bolts pass.

Any suitable means for conveying electric current to the motor 116 may be provided, such as a pair of conductor rails and shoes, overhead trolleys and fixed conductors, or most advantageously, a trailing electric cable, indicated at 126 which may drape itself on the floor at that side of the conveyor remote from the bins, and connect the motor to the switch box 120.

At the inclined end of the frame, close to its bottom edge, there is mounted a curved inclined deflector shoe 127, whose lower edge runs in close proximity to the upper surface of the main conveyor belt, and is so sloped in the direction of the length of the main conveyor as to scoop up the oncoming plant product and raise it into contact with the outer face of the deflector belt, which, being at a sufficient angle transversely of the length of the main conveyor, will readily force such plant product laterally and discharge it from the main conveyor to the respective bins. The deflector shoe 127 is parallel to the deflector belt and extends upward somewhat above the lower edge of the deflector belt. It may be adjustably mounted on the unloader frame, as by slots and bolts extending therethrough into the frame, to permit an accurate and close adjustment of the forward operative edge of the deflector shoe 127 toward and nearly into contact with the upper surface of the main conveyor belt, to prevent as much as possible the entrance of any part of the plant product, for example, lettuce leaves, beneath the shoe.

In the first type illustrated in Figs. 1, 2, and 3, the positive means for moving the plant product transversely of the main conveyor belt includes a transversely arranged, substantially horizontal endless belt on which the plant product is deposited by the main conveyor. The second type illustrated in Figs. 7 to 11, has an endless belt arranged with its working face in an erect plane, usually about vertical, this plane extending transversely across the main conveyor at such an angle to the longitudinal axis of said main conveyor that the plant product, brought up to the unloading apparatus by the main conveyor, will come into contact with the face of the erect belt and will thereby be moved transversely across the main conveyor at an angle, and be discharged from the main conveyor into the respective bins.

In both the first and second types of unloading apparatus, means are provided for moving the entire unloading apparatus longitudinally of the main conveyor in both directions, that is to say, back and forth along said main conveyor, so as to automatically distribute the plant product to a plurality of bins. The apparatus is such that the rate of travel of the unloading apparatus along the main conveyor may be varied at will, and when desired such unloading apparatus may be allowed to remain stationary at any desired point of its travel, so as to continue the discharge of the plant product at any such point along the length of the main conveyor.

That type of unloading apparatus employing the horizontal discharge belt will be described first, and then the second type having the erect belt.

The first type of unloading apparatus, indicated generally at B', comprises a suitable frame supporting a hopper or bin B², having a bottom formed of an endless belt arranged to run in a direction transverse to the main conveyor belt and above the latter. This transverse endless belt is indicated at 53. It passes around a drive roller 54 at one end and around an idler roller 55 at the other end, and may be supported between the said two rollers if required, by intermediate supporting rolls 56, for the upper run of the belt and 57 for the lower run of said belt.

The shaft of the drive roller 54 is extended as shown at 58 and is provided with a suitable driving means. In the present example, this may comprise gearing operated by the main conveyor belt. In this case the shaft 58 carries a bevel gear 59 fixed on said shaft and arranged to mesh with a bevel gear 60, fixed on a transverse shaft 61 carried in suitable bearings in the frame of the unloading apparatus. The transverse shaft 61 is provided with a chain wheel 62 fixed to it.

The frame of the unloading apparatus has two transverse drums 63 and 64, mounted on shafts 65 and 66, respectively, which extend transversely of the main conveyor belt, one drum having its lower face tangential to the normal plane of the upper face of the main conveyor belt, and the other drum 63 being mounted high enough to be well above the transverse conveyor belt 53 for a purpose which will appear hereinafter. The drum shafts 65 and 66 are journaled in suitable bearings in the frame of the unloading apparatus. The main conveyor belt 28 has its upper run passed around and over the drum 64, then under, around and over the drum 63, from which it sags down at an incline to its normal level, suitable additional supporting rollers being supplied if necessary. In practice one such roller 67 journaled in bearings in the frame of the unloading apparatus will suffice.

The drum 63 is fixed to its shaft 65, and the latter is provided with a chain wheel 68 connected by a drive chain 69 with the chain wheel 62.

By the arrangement disclosed, the main conveyor belt drives the drums 63 and 64, and the drum 63 drives the bevel gearing and rotates the shaft 58 which drives the transverse conveyor belt 53. It will be seen that with the main conveyor belt traveling in the direction from right to left in Fig. 6, is indicated by arrow a, any heads of lettuce or like plant product deposited upon the upper run of said main conveyor belt at the right hand end, as for example by the lettuce supplying means C, will travel to the unloading apparatus B', will be carried up the incline and be dropped into the hopper or bin and onto the upper run of the transverse belt conveyor, which moves in such a direction transversely as to discharge the product into the bins D, Fig. 6.

Thus far described, the unloading apparatus will discharge at one point only. In order to provide for the distribution of products substantially throughout the effective length of the main conveyor, suitable means are provided for moving the unloading apparatus lengthwise back and forth in the direction of the length of the main conveyor, either to the full extent of its travel or through any shorter range of travel, as circumstances may require, to distribute the plant products as may be necessary to maintain a supply to the operatives.

The means for traveling the unloading device, indicated generally at B' back and forth through any desired range of travel in the direction of the length of the main conveyor, in the present example, comprises a pair of draft cables 128 and 129, each of which has one end attached to eyes 130 and 131, respectively, carried by the frame of the unloading apparatus, the draft cable 129 passing in one direction to and around a sheave 133 and back to a winding drum 73 located beneath the main conveyor, usually about midway of its length while the other draft cable 128 passes in the opposite direction to and around a sheave 132 and then to the winding drum 73. The ends of the draft cables are wound in opposite directions on the winding drum so that as one cable is wound up, the other cable is unwound, and vice versa, according to the direction of rotation of the winding drum 73.

The winding drum may be rotated in any suitable way. In the present example the winding drum 73 is illustrated as driven by an electric motor 75 having a pulley or chain wheel 76 connected to a corresponding pulley or chain wheel 77 fixed on the shaft of the winding drum 73, the connection from one pulley or chain wheel to the other pulley or chain wheel, respectively, being by a belt or chain, indicated at 78.

The motor which drives the winding drum must be a reversible motor, so that it may be controlled to operate the winding drum in both directions of revolution, as may be desired. In usual practice the motor is an electric motor and is controlled by suitable control means involving a pole-changing switch 79 to determine the direction of revolution of the motor, and a rheostat or voltage control mechanism 80 to determine speed of travel of the unloading apparatus.

The speed having been adjusted by the rheostat or voltage control device, no further change of the latter will be necessary, but the pole-changing switch 79 must be operated at each end of the travel of the unloading apparatus. In the best embodiment of the invention, this operation will be done automatically. One convenient way to accomplish the desired result is to provide at one side of the main conveyor apparatus, in the path of the unloading apparatus, a pair of electric switches 81 and 82, each of which has an arm arranged to be struck by an arm 83, or 84, at its respective end of the frame of the unloading apparatus and thus thrown to close a circuit which includes relays 85 arranged to control an electromagnetic apparatus 86 for shifting the pole-changing switch 79 to reverse the direction of rotation of the electric motor. By making the electric switches adjustable along the frame of the main conveyor, the range of movement of the unloading apparatus may be adjusted as desired.

A manually operated switch 86' may be provided to cut off current from the main source of supply to the motor so that the latter may remain stationary. In this condition, if the main conveyor belt is still operating, the plant product will be discharged at one place only.

The main conveyor belt passes around a driving drum 87 at one end and around an idler drum 88 at the other end. A reversible motor operates the driving drum 87 so that the upper run of the main conveyor belt may be made to travel in either direction. For the purpose of controlling the direction of movement of said upper run, the motor 89 for driving it is arranged to be controlled by a pole-changing switch 90, which may be manually operated. Also a rheostat or voltage changing means 91, manually controllable, may be supplied in order that the speed of travel of the main conveyor belt may be regulated as desired.

It will be noted that the unloading device is operative to receive plant products from the main conveyor belt only when said belt is running in one direction, for example, from right to left in Fig. 3. When the belt is running in the opposite direction, the plant products will not be carried up to the face of the endless belt 115 of the unloading device but will be brought toward that end of the frame of said unloading device away from the special unloading means, and will be stopped. By providing this end of the unloading device with a sheer board 134 set at an incline across the main conveyor belt, and by stopping the motor which operates the winding drum, any products which may be supplied by the main conveyor belt when its upper run is moving from left to right, Fig. 3, will be discharged laterally from the said belt upon reaching the stationary unloading apparatus, by means of the inclined sheer board.

In the ordinary use of the plant for handling lettuce, the main conveyor belt runs in the direction to carry the lettuce to the unloading belt 115 which directs the lettuce transversely across the main conveyor and discharges it into the small or lettuce bins D, the back and forth travel of the unloading apparatus serving to distribute the lettuce heads along the small bins so as to maintain a sufficient supply to a number of operatives working at said bins.

When the apparatus is working on another plant product, for example cantaloupes, the direction of travel of the main conveyor belt is reversed, and the plant product is supplied from the end opposite that from which the first plant product was supplied. For example, in the apparatus illustrated in Fig. 3, the cantaloupes will be supplied at the left and the main conveyor will travel to the right. The unloading apparatus may be adjusted along the main conveyor and allowed to remain stationary at the adjusted position, so that as the cantaloupes are brought up to said unloading device, they will strike the inclined sheer board 134 carried by it and be forced laterally into the large bins C at that time formed as described in Patent No. 2,336,775 when the table top sections and their attached side sections are in their extended positions. By adjusting the unloading apparatus along the main conveyor, the point of discharge of the cantaloupes may be adjusted.

It will be noted that the main conveyor mechanism in conjunction with the unloading apparatus comprises a conveying and discharging apparatus particularly suitable for conveying and discharging articles which must not be too roughly handled, such as lettuce, cabbage, cauliflower or the like.

It will be seen that while the means for supplying lettuce, for example, to one end of the main conveyor belt is in use, the means for supplying cantaloupes to the other end of the said belt is idle and vice versa. Practically all the remainder of the apparatus, however, performs a conjoint function since it is capable of use in packing both types of plant product. As a result, the investment in apparatus is greatly decreased as compared with prior apparatus, the cost of removing and replacing apparatus is avoided, and only one of the two means for supplying plant products to the main conveyor belt is idle at one time. Hence the expense of handling the respective products is very materially reduced.

What is claimed is:

In an apparatus for use in preparing, grading and packaging for market a plurality of plant products, the combination, with a main conveyor having a frame and an endless conveyor belt mounted therein, bins arranged at one side of said frame, means for driving the upper run of the endless conveyor belt in both of its two longitudinal directions, means for supplying one type of plant product at one end of the main conveyor belt, and means for supplying another type of plant product at the opposite end of the main conveyor belt, of an unloading device comprising a frame arranged to move in the direction of the length of the main conveyor belt and mounted above it, an endless deflector belt mounted on the frame at its end facing the oncoming plant products on the main conveyor belt, said deflector belt having its outer run in an erect plane extending transversely of the length of the main conveyor belt at an angle such as to deflect and discharge oncoming plant products laterally from the main conveyor belt at the side of the latter toward the bins, means for driving the said endless deflector belt so that its outer face will travel toward the discharge side, a shoe carried by the frame of the unloader, at the lower side of the endless deflector belt in close proximity to the main conveyor belt whereby said shoe will make contact with plant products brought up by the main conveyor belt and guide them into contact with the outer face of the endless deflector belt and means for traveling the unloading device in the direction of the length of the belt in both directions.

HARRY CLINTON BREST.

REFERENCES CITED

The following references are of record in the file of this patent:

UNITED STATES PATENTS

| Number | Name | Date |
|---|---|---|
| 873,991 | Cunningham | Dec. 17, 1907 |
| 1,585,694 | Schoew | May 25, 1926 |
| 1,729,671 | Bell-Irving et al. | Oct. 1, 1929 |

FOREIGN PATENTS

| Number | Country | Date |
|---|---|---|
| 25,367 | Great Britain | Nov. 6, 1913 |